United States Patent [19]

Yarbro

[11] 4,230,675

[45] Oct. 28, 1980

[54] APPARATUS FOR LEACHING CORE MATERIAL FROM CLAD NUCLEAR FUEL PIN SEGMENTS

[75] Inventor: Orlan O. Yarbro, Knoxville, Tenn.

[73] Assignee: The United States of America as represented by the United States Department of Energy, Washington, D.C.

[21] Appl. No.: 878,047

[22] Filed: Feb. 15, 1978

[51] Int. Cl.³ .................... B01D 11/02; B01F 1/00
[52] U.S. Cl. .................... 422/272; 422/159; 422/274; 422/275; 252/301.1 W
[58] Field of Search .............. 422/272, 274, 225, 159; 176/39; 252/301.1 W

[56] References Cited

U.S. PATENT DOCUMENTS

| | | | |
|---|---|---|---|
| 3,660,042 | 5/1972 | Duchateau et al. | 422/272 |
| 3,730,689 | 5/1973 | Odom et al. | 422/272 |
| 3,809,538 | 5/1974 | Duchateau | 422/274 |
| 3,930,801 | 1/1976 | Pinet | 422/275 |

OTHER PUBLICATIONS

Odom, "Continuous ... Leacher ... ", pp. 101–104, Proceedings of 20th Conf. on Remote Systems Tech., 1972.

Primary Examiner—Bradley R. Garris
Attorney, Agent, or Firm—Richard G. Besha; Stephen D. Hamel; Fred O. Lewis

[57] ABSTRACT

This invention relates to improved apparatus for counter-currently contacting liquids and solids to dissolve, or leach, a selected component of the solids while minimizing back-mixing of the liquid phase. The apparatus includes an elongated drum which is rotatable about its longitudinal axis in either direction and is partitioned radially into a solids-inlet/liquid-outlet compartment at one end, a solids-outlet/liquid-inlet compartment at its other end, and leaching compartments therebetween. The drum is designed to operate with its acid-inlet end elevated and with the longitudinal axis of the drum at an angle in the range of from about 3° to 14° to the horizontal. Each leaching compartment contains a chute assembly for advancing solids into the next compartment in the direction of solids flow when the drum is rotated in a selected direction. The chute assembly includes a solids-transfer baffle and a chute in the form of a slotted, skewed, conical frustum portion. When the drum is rotated in the direction opposite to that effecting solids transfer, the solids-transfer baffles continually separate and re-mix the solids and liquids in their respective compartments. The partitions defining the leaching compartments are formed with corresponding outer, annular, imperforate regions, each region extending inwardly from the partition rim to an annular array of perforations concentric with the rim. In each leaching compartment, the spacing between the rim and the perforations determines the depth of liquid at the liquid-outlet end of the compartment. The liquid input to the drum assembly flows continuously through the compartments, preventing back-mixing due to density differences, whereas backflow due to waves generated by the solids-transfer baffles is virtually eliminated because of the tilted orientation of the drum assembly.

8 Claims, 2 Drawing Figures

APPARATUS FOR LEACHING CORE MATERIAL FROM CLAD NUCLEAR FUEL PIN SEGMENTS

BACKGROUND OF THE INVENTION

This invention was made in the course of, or under, a contract with the United States Energy Research and Development Administration.

The invention relates broadly to rotary apparatus for effecting chemical leaching, or dissolving, and more particularly to improvements in rotary apparatus for leaching nuclear-fuel-containing core material from segments of metal-clad nuclear fuel pins.

U.S. Pat. No. 3,730,689, issued on May 1, 1973, to C. H. Odum et al, discloses leaching apparatus designed to (a) receive segments of metal-clad nuclear fuel pin assemblies, (b) preferentially dissolve the nuclear-fuel core material therefrom, and (c) separately recover the resulting leach solution from the undissolved solids. Briefly, the apparatus includes a horizontally disposed cylindrical drum, which is rotatable in either direction about its longitudinal axis. The drum is divided axially by extensively perforated partitions into end compartments and a series of leaching compartments. One of the end compartments is designed to receive spent fuel-pin segments and to discharge liquid containing dissolved solids, whereas the other end compartment is designed to discharge undissolved solids and to receive fresh liquid dissolvent. That is, the leacher is designed for countercurrent flow of the dissolvent and solids. The various perforated partitions restrict axial movement of the solids through the drum while permitting substantially unrestricted continuous flow of the dissolvent. Typically, the amount of solids and liquid in a leaching compartment is equivalent to 5-10% of the compartment volume. In a normal operation, the drum is rotated in a given direction to effect intimate mixing. Periodically, the drum is stopped and then reversed for one revolution to transfer solids from each compartment to the next. The total residence time for the solids in the leacher is fixed by controlling the number of reversals per unit time.

Still referring to the above-referenced patent, the typical leaching compartment contains a sloped solids-transfer baffle and a solids-transfer chute. These effect the above-mentioned transfer of solids from each leaching compartment to the next while the drum is being rotated clockwise for one revolution. The typical leaching compartment also contains a perforated mixing baffle. During each rotation of the drum in the mixing (counterclockwise) direction, the typical mixing baffle lifts the solids in its compartment out of the liquid dissolvent therein and then returns them to the liquid. The dissolvent draining from the lifted solids falls on the sloped transfer baffle in that compartment and flows by gravity through the adjacent perforated partition and into the next compartment. This pumping action raises the liquid level at the dissolvent-discharge end of the drum; most of the liquid thus displaced flows back through the perforated partitions, seeking to re-establish the normal liquid level throughout the bottom section of the drum. Part of the liquid reaching the dissolvent-discharge compartment exits through a product-takeoff line.

Tests conducted with a laboratory-scale model of the above-described leacher have shown that its performance is generally satisfactory, with the exception that it operates with excessive back-mixing. That is, it has been found that liquid containing dissolved nuclear fuel material tends to flow through the leacher toward the acid-inlet end, although there is a continuous flow of liquid through the leacher from the acid-inlet to the acid-outlet end and although the liquid levels in the various compartments are substantially equal. Tests indicate that this back-mixing is due principally to the fact that the leacher operates with a higher liquid density at the solids-input/liquid-outlet end. For instance, the density of the liquid in the end compartment where the solids are introduced may be, say, 1.4 g/ml, whereas the densities in the other compartments progressively decrease to a value of, say, 1.1 g/ml in the compartment at the opposite end. The resulting hydraulic imbalance causes the denser liquid to flow toward the acid-inlet end, this flow being along the bottom of the drum, through the various compartments and the perforated partitions therebetween.

This above-mentioned back-mixing appreciably reduces the overall efficiency of the leacher. This loss in efficiency can be offset by increasing the number of leacher components (stages), but this results in higher capital costs, increased complexity, and additional maintenance. Alternatively, the back-mixing can be reduced to tolerable levels by (1) eliminating the perforations in the aforementioned partitions so as to prevent free liquid flow between compartments and (2) incorporating in each compartment a waterwheel-like device for advancing liquid to the next compartment. However, this solution also is objectionable because of increased cost and complexity.

OBJECTS OF THE INVENTION

Accordingly, it is an object of this invention to provide an improved rotary leacher for contacting liquids and solids.

It is another object to provide an improved multi-compartment rotary leacher of the elongated-drum type wherein liquids and solids are contacted countercurrently with relatively little back-mixing of the liquid phase.

It is another object to provide a rotary leacher of the kind just described wherein continuous throughput of the liquid phase is effected with relatively little back-mixing despite density differences in the liquid inventories in the various compartments and despite rotation-induced waves in the compartments.

SUMMARY OF THE INVENTION

The invention may be summarized as follows: In rotary apparatus for countercurrently contacting liquids and solids, said apparatus including an elongated and generally cylindrical drum assembly which is rotatable in either direction about its longitudinal axis and which is divided by circumferentially sealed, transversely extending partitions into a solids-inlet/liquid-outlet compartment at one end of said assembly, a solids-outlet/liquid-inlet compartment at the other end thereof, and a plurality of leaching compartments therebetween, said partitions being provided with perforations for conveying liquid flow between adjacent compartments; each of said leaching compartments containing a solids-transfer assembly for advancing solids into the next compartment in the direction of solids flow when said drum assembly is rotated in a selected direction, each chute assembly including a solids-transfer chute and a perforated baffle for directing solids into said chute when said drum assembly is rotated in said selected direction; the improvement comprising:

said partitions being formed with corresponding outer annular imperforate regions, each region extending inwardly from the rim of its respective partition to an annular array of perforations concentric with said rim, and said drum assembly being disposed with its solids-outlet/liquid-inlet end at a higher elevation than its other end, the longitudinal axis of said drum assembly forming an angle in the range of from about 3° to 14° with the horizontal.

BRIEF DESCRIPTION OF THE DRAWINGS

In FIGS. 1 and 2, parts corresponding to those shown in the above-referenced patent are identified by the same numbers as in the patent. The drawings are not to scale.

DESCRIPTION OF THE PREFERRED EMBODIMENT

Figure 1:
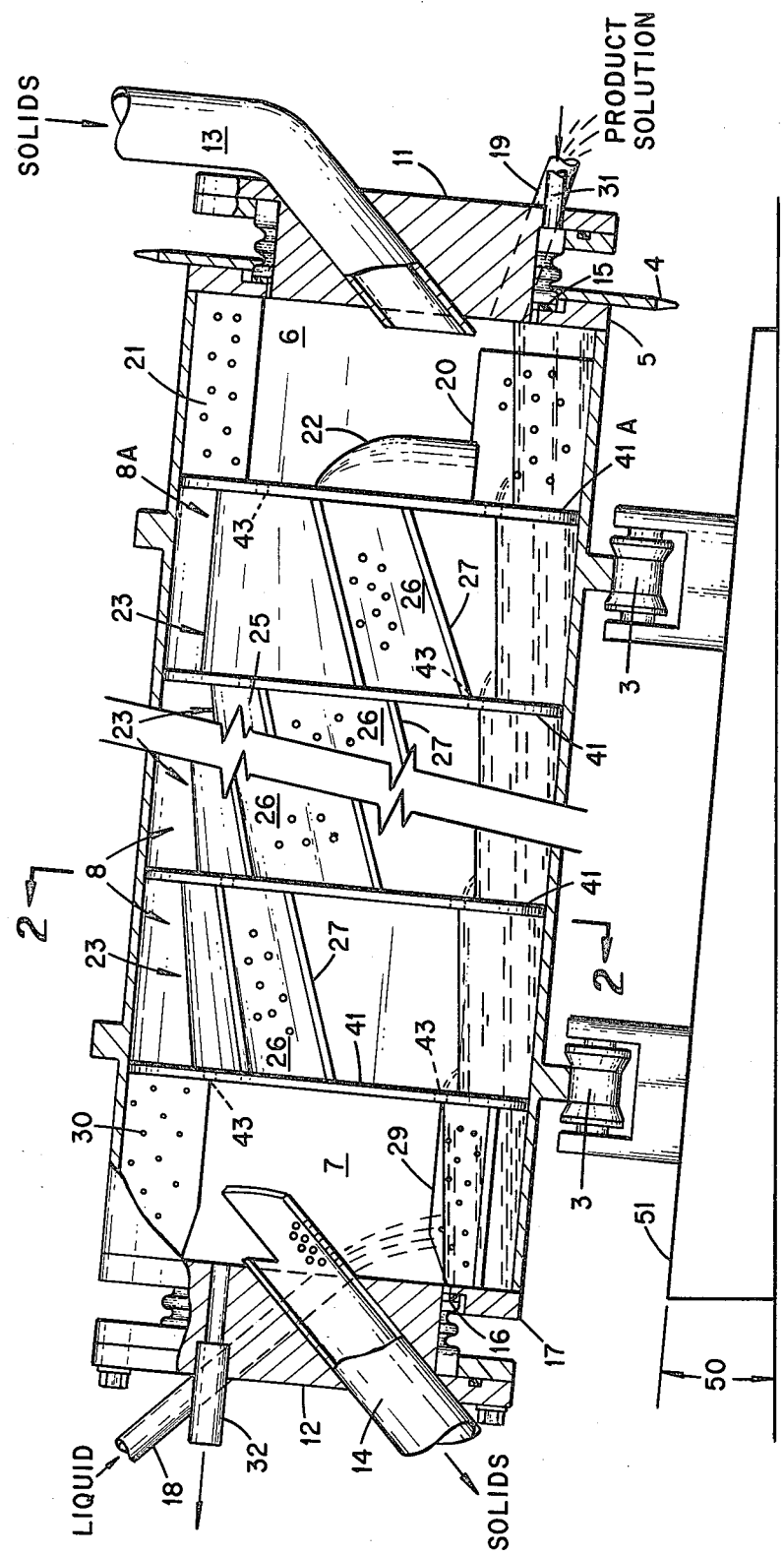
FIG. 1 is a longitudinal sectional view of apparatus generally similar to a rotary leacher disclosed in U.S. Pat. No. 3,730,689 but modified in accordance with this invention.
Figure 2:
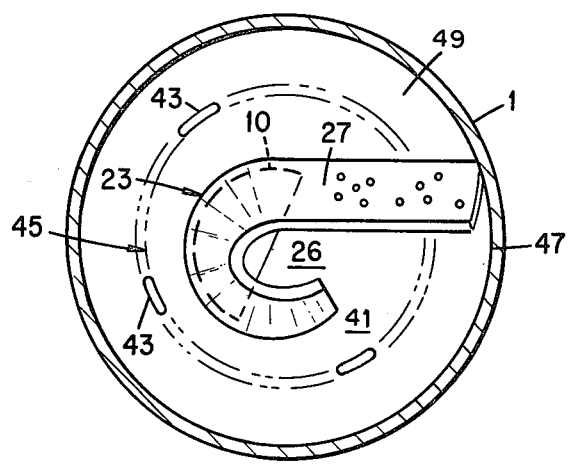
FIG. 2 is a crosssectional view, taken along lines 2—2 of FIG. 1.

In the embodiment of this invention shown in FIGS. 1 and 2, those parts having identification numbers in the range of 1–33 are identical with like-numbered parts described in the above-referenced patent. The other numbers designate parts which have been re-designed in accordance with this invention, to minimize back-mixing of the kind described above. An optional mixing baffle, designated as 28 in the patent, is not used in the preferred embodiment of this invention.

Referring to FIGS. 1 and 2, the drum assembly 1 is divided into compartments by identical partitions, as in the above-referenced patent, but the partitions have been provided with a different pattern of perforations. That is, in the typical modified partition (designated herein as 41), all of the liquid-flow perforations 43 are disposed in a circular array 45 (FIG. 2). The array is spaced inwardly from the rim 47 of the partition and is concentric with the rim. The spacing from the rim to the array 45 is identical for the various partitions and is selected to correspond to the design depth of liquid in the various compartments 8. Thus, the modified partitions 41 have corresponding outer, annular regions 49 which are imperforate and which are defined by the rim 47 and the array 43. Preferably, the perforations are in the form of arcuate slots (FIG. 2) to prevent entry of relatively large fragments of undissolved cladded solids.

Referring to FIG. 1, the rotatable drum assembly 1 is not mounted with its longitudinal axis horizontal, as in the above-referenced patent. Instead, the drum assembly is mounted with its liquid-inlet end at a higher elevation than its liquid-outlet end and with its longitudinal axis defining a selected acute angle with the horizontal. Thus, the orientation of the assembly 1 promotes the flow of liquid by gravity from the highest compartment (the solids-outlet/liquid-inlet compartment 7) to the lowest compartment (the solids-inlet/liquid-outlet compartment 6). FIG. 1 illustrates the idealized liquid levels obtaining in the dissolver, with fresh liquid dissolvent being introduced continually through the line 18 at a rate establishing continuous forward flow through the lowermost perforations 43, the various compartments, and the discharge line 19. The term "idealized" is used because in actuality the chute assemblies 23 generate waves in the leaching compartments 8 when the drum assembly is rotated clockwise to advance undissolved solids. The wave fronts travel in a direction opposite to the desired direction for liquid flow and have an amplitude which increases with the speed of rotation and the size of the chute assemblies. To prevent the back-mixing which would result from wave induced backflow through the perforations, the drum assembly 1 is tilted as described. Preferably, the amount of tilt is kept as small as is consistent with preventing appreciable backflow through the perforations. In the illustrated embodiment, the drum-supporting surface of the baseplate 51 forms an angle of 5° with the horizontal, providing a like angle of inclination for the longitudinal axis of the drum assembly. The optimum value for the angle may vary from one leacher to another, but in general an angle in the range of from about 3° to 14° will give acceptable results. Smaller angles permit an undesirable amount of backflow, whereas larger angles introduce complexities in mechanical design.

During a typical leaching operation, a solid mixture, such as sheared segments of clad nuclear fuel pins, is charged to feed compartment 6 in either a continuous or batchwise manner through feed tube 13. Counterclockwise rotation of drum 1 causes the solids in feed compartment 6 to be picked up by baffle 20 and a portion thereof dumped into the solids transfer scoop 22 with each rotation. Those solids which enter transfer scoop 22 immediately pass through opening 10 (FIG. 2) in partition 41A to first leaching compartment 8A. Continued counterclockwise rotation causes the solids to be repeatedly swept peripherally through liquid dissolvent in the lower part of compartment 8A, raised out of the liquid, and then spilled back into the dissolvent by the action of perforated baffle 27. At the same time, dissolvent flows through the drum compartments by gravity, as shown in FIG. 1, rather than by the pumping action described in the abovereferenced patent. Although the chute assemblies 23 generate waves as they sweep through the liquids in their various compartments, back-flow through the perforations 43 is minimized by the abovedescribed inclination of the drum assembly.

When it is desired to move the solids upstream to a leaching compartment containing a greater dissolution ability and lower concentration of dissolved solids, the counterclockwise rotation of the drum is stopped and the direction of drum rotation reversed to clockwise. Within approximately 1¼ revolutions, all solids within each of the leaching compartments are moved toward discharge compartment 7 to the next adjacent compartment through the action of solids-transfer baffles 27 and transfer chutes 23 without intermixing of the solids in each compartment. The above sequence of dissolution and solids transfer is repeated until all the leaching compartments have been traversed and only those solids, such as fuel pin cladding segments, which are not to be dissolved, reach discharge compartment 7 where they are picked up by perforated baffles 29 and 30 and dumped into discharge tube 14. Baffles 29 and 30 and the end of the discharge tube 14 extending into discharge compartment 7 are perforated to minimize passage of dissolvent through discharge tube 14.

Use of a sweep or purge gas may be desired where depleted nuclear fuel is being processed in order to remove and trap radioactive fission product gases. As shown, an inlet gas line 31 is adapted to discharge into the annular space between stationary drum head 11 and the bellows support for face seal 15. The gas passes between drum head 11 and end plate 5, through compartments 6, 7, and 8, between drum head 12 and end plate 17, through the annular space between drum head 12 and the bellows support for face seal 16, and out through outlet gas line 32 to a trap (not shown). The dissolution and solids transfer time cycle is regulated to correspond with optimum dissolvent concentration and flow rate to optimize the differential solubility of the solids along with the geometrical and mechanical characteristics of the solids.

As shown in FIG. 1, the angular position of slots 26 in transfer chutes 23 and solids-transfer baffles 27 in respective leaching compartments may be staggered with respect to each other to present a more uniform weight distribution in drum 1, thereby providing a more uniform operating load to the drive motor. Total angular displacement between all stages must be limited to about 90 degrees, however, so that solids transfer from all compartments may be completed within about 1¼ revolutions of drum 1.

This invention has been tested in experiments conducted with a glass-enclosed laboratory-scale rotary assembly having leaching compartments designed as shown in FIGS. 1 and 2 and having its liquids-inlet end elevated to provide an angle of 5° between its longitudinal axis and the horizontal. In these tests, the typical partition 41 (FIGS. 1 and 2) had a diameter of 12", and its perforations 43 were spaced 1⅜" from the rim 47 of the partition. Thus, the depth of liquid at the outlet end of the typical compartment approximated 1⅜". The typical partition was provided with twelve equally spaced, arcuate perforations, each having a length of 1 3/16" and a width of 3/16". The typical leaching compartment had a width of 5". Tests were run at rotational speeds of 9 and 13 rpm to create, on a scaled basis, wave fronts characteristic of a large-scale leacher when operated at design speed. Movements of the liquid in the compartments were recorded on high-speed film at 100 frames/sec. No back-mixing of the liquid was detected at either speed of rotation. Maximum wave heights of 0.25" and 0.438" were observed at 9 rpm and 13 rpm, respectively, but the 0.5" difference in elevation between the inlet and outlet perforations 43 for the typical compartment prevented backflow of the liquid.

Although the invention has been illustrated above in terms of leaching core material from nuclear-fuel-pin segments, it is applicable to various other liquid-contacting applications-as, for example, the leaching of ores. Referring to the assembly shown in FIG. 1, the face seals 15 may be eliminated, and as an alternative a small annular gap may be left between the rotating assembly and the stationary drum heads 11, 12. In that case, the drum assembly 1 may be enclosed in a stationary shroud (not shown) to which steam or some other suitable gas is admitted continuously to flow through the annular gaps, thus serving as both a buffer gas and a purge gas. The steam input to the shroud also may be used as a temperature control for the drum assembly. If desired, the drum assembly shown in FIG. 1 may be provided with additional liquid inlets and outlets, as well as with additional compartments. Thus, it is intended that the scope of the invention be limited only by the scope of the appended claims.

What is claimed is:

1. In rotary apparatus for countercurrently contacting liquids and solids, said apparatus including an elongated and generally cylindrical drum assembly which is rotatable in either direction about its longitudinal axis and which is divided by circumferentially sealed, transversely extending partitions into a solids-inlet/liquid-outlet compartment at one end of said assembly, a solids-outlet/liquid-inlet compartment at the other end thereof, and a plurality of leaching compartment therebetween, said partitions being provided with perforations for conveying liquid flow between adjacent compartments; each of said leaching compartments containing a solids-transfer chute assembly for advancing solids into the next compartment in the direction of solids flow when said drum assembly is rotated in a selected direction, each chute assembly including a solids-transfer chute and a perforated baffle for directing solids into said chute when said drum assembly is rotated in said selected direction; the improvement comprising:

said partitions being formed with corresponding outer annular imperforate regions, each region extending inwardly from the rim of its respective partition to an annular array of perforations concentric with said rim, each region having a width which prevents intercompartmental backflow of relatively dense liquid along the bottom portion of said assembly and which corresponds to the desired maximum depth of liquid in said leaching compartments, and said drum assembly being disposed with its solids-outlet/liquid-inlet end at a higher elevation than its other end, the longitudinal axis of said drum assembly forming an angle in the range of from about 3° to 14° with the horizontal, said angle establishing in said assembly liquid levels for effecting forward flow through the annular arrays while substantially preventing backflow therethrough of waves produced by said chutes.

2. The apparatus of claim 1 wherein said perforations are of arcuate shape.

3. The apparatus of claim 2 wherein the arcuate perforations have a common center of generation.

4. The apparatus of claim 1 wherein each solids-transfer chute comprises a skewed frusto-conical surface portion having an axial slot.

5. The apparatus of claim 4 wherein said surface portion is integrally joined along one side of said slot with a portion of said baffle extending radially to the wall of said drum assembly and axially between a pair of partitions defining a leaching compartment.

6. The apparatus of claim 5 wherein said portion of said baffle lies in a plane extending tangentially to said frusto-conical surface portion where said baffle meets said surface portion along one side of said slot.

7. In rotary apparatus for countercurrently contacting liquids and solids, said apparatus including an elongated and generally cylindrical drum assembly which is rotatable in either direction about its longitudinal axis and which is divided by circumferentially sealed, partitions normal to said axis into a solids-inlet/liquid-outlet compartment at one end of said assembly, a solids-outlet/liquid-inlet compartment at the other end thereof, and a plurality of leaching compartments therebetween, each of said partitions being formed with an opening in the central region thereof for passage of solids and with perforations disposed outwardly of said opening for conveying liquid flow between adjacent compartments; each of said leaching compartments containing a chute assembly for advancing solids into the next compartment in the direction of solids flow when said drum assembly is rotated in a selected direction, each chute assembly including a solids-transfer chute and a perforated baffle for directing solids into said chute when said drum assembly is rotated in said selected direction and for continually separating and re-mixing the solids and liquids in its respective compartment when said drum assembly is rotated in the opposite direction; the improvement comprising:

said partitions being formed with corresponding outer annular imperforate regions having a width corresponding to the desired maximum depth of liquid in said leaching compartment and blocking intercompartmental backflow of relatively high-density liquid, each of said regions being bounded by the rim of its respective partition and an annular array of perforations concentric with the rim of its respective partition, and said drum assembly being disposed with its solids-outlet/liquid-inlet and elevated with respect to its other end and with its longitudinal axis at an angle of from about 3° to 14° with the horizontal for establishing in said assembly liquid levels which permit forward flow of liquid through the annular arrays and substantially prevent backflow resulting from waves generated in said liquid by said chutes.

8. The apparatus of claim 7 wherein said perforations are of arcuate shape.

* * * * *